DAVID LORRIAUX.
Improvement in Automatic Seed-Planter.

No. 126,721. Patented May 14, 1872.

Witnesses:
P. C. Dieterich
Alex F. Roberts

Inventor:
D. Lorriaux
per
Attorneys.

126,721

UNITED STATES PATENT OFFICE.

DAVID LORRIAUX, OF OTTAWA, ILLINOIS.

IMPROVEMENT IN AUTOMATIC SEED-PLANTERS.

Specification forming part of Letters Patent No. 126,721, dated May 14, 1872.

Specification describing a new and useful Improvement in Automatic Seed-Planter, invented by DAVID LORRIAUX, of Ottawa, in the county of La Salle and State of Illinois.

Figure 1:
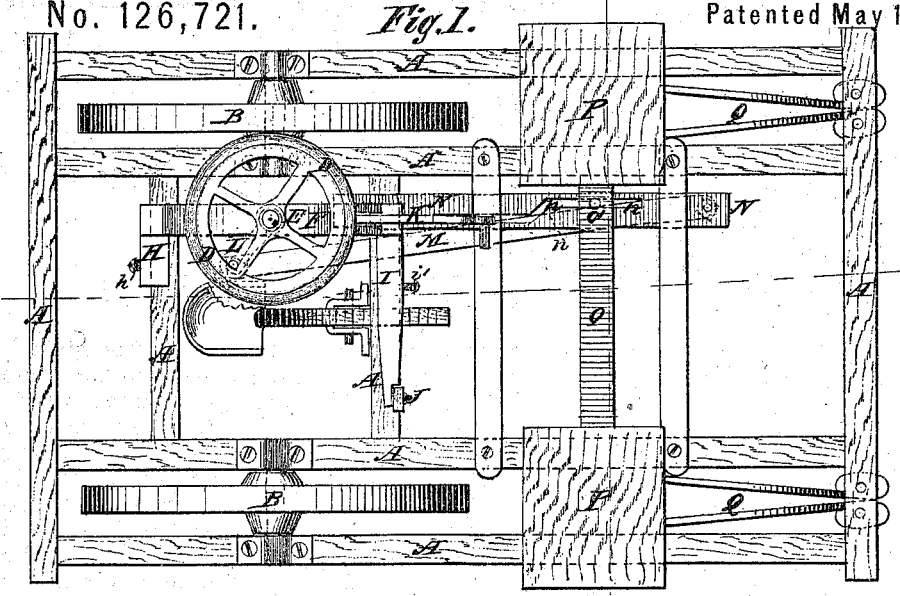
Figure 2:
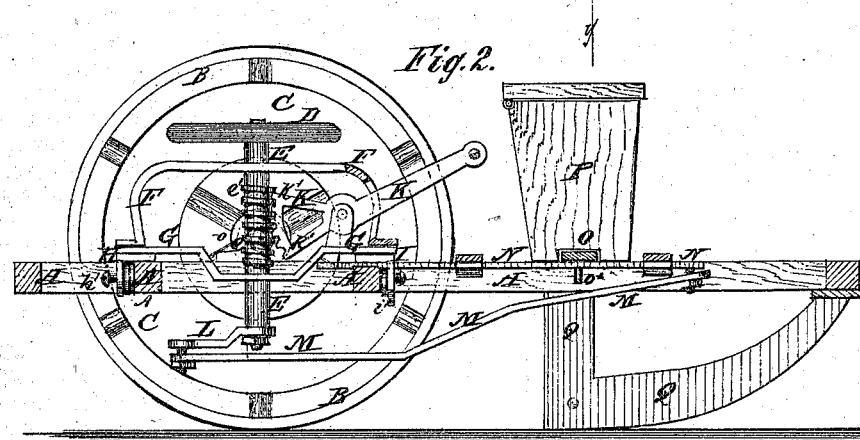
Figure 3:
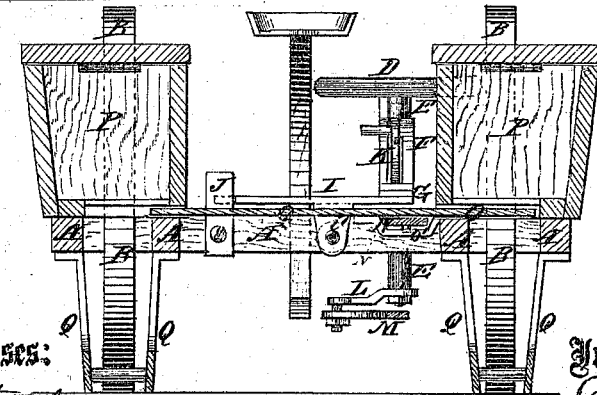

Figure 1 is a top view of my improved seed-planter. Fig. 2 is a detail vertical longitudinal section of the same, taken through the line $x\,x$, Fig. 1. Fig. 3 is a detail vertical cross-section of the same, taken through the line $y\,y$, Fig. 1.

Similar letters of reference indicate corresponding parts.

My invention has for its object to furnish an improved seed-planter, which shall be so constructed that the dropping device may be operated automatically by the advance of the machine, and so that the dropping device may be adjusted to work faster or slower by the driver while the machine is in motion; and it consists in the construction and combination of various parts of the machine as hereinafter more fully described.

A is the frame of the machine, which is made with two parallel side bars at each side to receive the wheels B between them. The journals of the wheels B revolve in bearings attached to the side bars of the frame A. One or both the wheels B have ring-plates C attached to them, or have a ring-surface, C, formed upon their inner sides, against which bears the face of the friction-wheel D. The wheel D may be made of wood or metal, and its face may, if desired, be faced or bound with rubber, or provided with small wheels or rollers to bear against the plate C, so that the wheel D may be raised and lowered without affecting its forward movement. By this arrangement the motion of the wheel D will be accelerated by moving it from the center of the wheel B, and retarded by moving it toward said center. The wheel D is attached to the upper end of the vertical shaft E, which revolves and moves vertically in bearings in the bars or frame F G, the ends of which are connected to each other, and the middle parts of which are spread apart, so that they may hold the shaft E in a vertical position. The rear ends of the bars F G are attached to the outer end of a plate, H, which rests upon a cross-bar of the frame A, and has a downwardly-projecting lug, $h'$, formed upon the side edge of its inner end to receive the screw or bolt by which it is pivoted to said cross-bar. The forward ends of the bars F G are attached to the outer end of the lever I, which extends along a cross-bar of the frame A, and has a downwardly-projecting lug, $i'$, formed upon its side edge at a distance from its outer end equal to the distance of the lug $h'$ of the plate H from the outer end of said plate. By this construction, by raising the inner end of the lever I the wheel D will be moved outward to bring its face in contact with the plate C of the wheel B; and by lowering the inner end of the said lever I the wheel D will be moved away from the plate C, and will no longer be revolved by the revolution of the wheel B. The lever I is provided at its inner end with a spring-catch, J, to hold it in position when adjusted. Upon the body of the vertical shaft E between the bars F G, are formed a series of ring flanges, $e'$, into which mesh the teeth $k'$ formed upon the end of the lever K, which end is formed in the arc of a circle having its center at the pivoting-point of said lever. The other end of the lever K projects, and may be operated by the driver with his hand or foot, as may be desired. By this construction, by operating the lever K the wheel D may be raised or lowered to give a faster or slower motion to the wheel D, according as it is desired to plant the seed closer together or further apart. To the lower end of the shaft E is attached a crank-arm, L, to the end of which is pivoted the rear end of the connecting-rod M, the forward end of which is pivoted to the forward end of the bar N, which slides in notches or keepers formed in or attached to the cross-bars of the frame A, or in cross-bars attached to said frame A. In the sliding bar N is formed a slot, $n'$, which is made a little longer than the throw of said bar, and with an inclined offset in its middle part, the end parts of the said slot running along the opposite side edges of the said bar, as shown in Fig. 1. O is the bar that connects the dropping-slides that remove the seed from the hoppers P, and allow it to fall into the furrow formed by the openers Q. To the bar O is attached a pin, $o'$, which passes through the slot $n'$ in the sliding bar N, so that the dropping-slides may be operated or moved twice at each revolution of the wheel D, so that the seed may be dropped by the advance of the machine, when the wheel D is in contact with the plate C of the wheel B.

Having thus described my invention, I claim as new, and desire to secure by Letters Patent—

1. The arrangement of the toothed foot-lever K, shaft E provided with ring-flanges $e'$, the friction-wheel D, crank-plate C, wheel B, crank L, rod M, slotted bar N, and seed-slide O, all as set forth.

2. The combination of the pivoted plate H $h'$, pivoted adjusting-lever I $i'$, and catch J, with the bars or frame F G that supports the shaft E of the friction-wheel D, substantially as herein shown and described, for the purpose of turning the friction-wheel into and out of contact with the driving-wheel, as set forth.

DAVID LORRIAUX.

Witnesses:
R. W. BUCHANAN,
C. D. FAIRBANKS.